Figure 1:
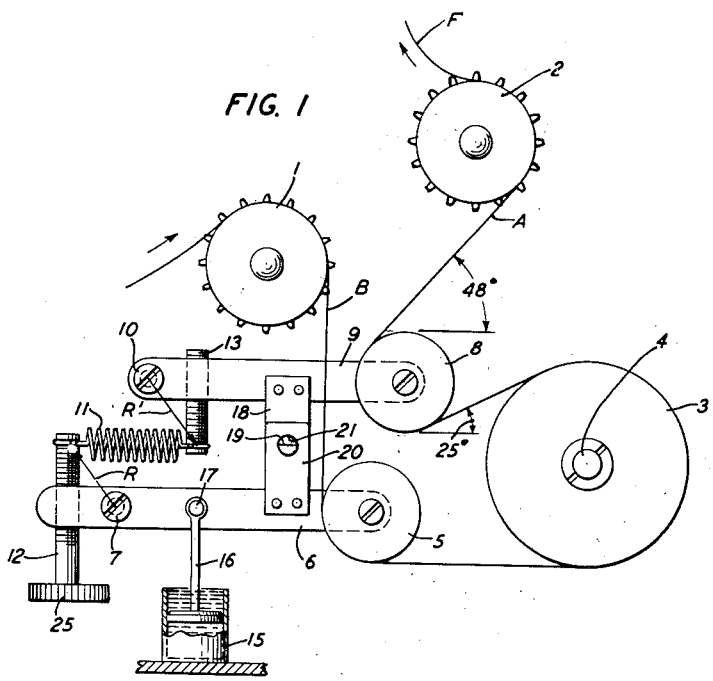

Oct. 9, 1951  C. C. DAVIS  2,570,773
FILM TENSIONING APPARATUS
Filed Dec. 6, 1949

INVENTOR
C. C. DAVIS
BY
J. F. McEneany
ATTORNEY

Patented Oct. 9, 1951

2,570,773

UNITED STATES PATENT OFFICE 2,570,773

FILM TENSIONING APPARATUS

Charles C. Davis, West Los Angeles, Calif., assignor to Western Electric Company, Incorporated, New York, N. Y., a corporation of New York Application December 6, 1949, Serial No. 131,342

3 Claims. (Cl. 271—2.3)

This invention relates to mechanical filters used in film propelling mechanisms employed in sound film recording and reproducing apparatus and particularly to improvements in such filters of the double roller type in which the pivoted supporting arms for the film engaging rollers are interconnected by a single spring.

Heretofore, mechanical filters of the double roller type have been designed for use in film drives in which the film path is the same with respect to each roller so that the film tension produces in each roller an equal resultant force at right angles to the length of the roller supporting arms. Therefore, to equalize the tension in the film on both sides of a film supporting drum, it is necessary only to produce an equal opposing force in each roller, which can be done readily by a single interconnecting spring having its ends permanently anchored in the roller supporting arms at predetermined points along these arms.

This relatively inexpensive type mechanical filter has proven so successful in eliminating disturbances in the film at the sound translation point that its use is contemplated as an attachment for existing equipment, such as, a motion picture camera modified to include a sound recording equipment. The greatest difficulty encountered in such modification is the impossibility in most cases of obtaining space within the camera housing in which the film path is the same with respect to both film engaging rollers of the mechanical filter. Also, for one type of camera, the film path with respect to each roller will be different from the film path encountered in another type of camera, so that, a filter mechanism as provided heretofore and designed for one camera, cannot be used with success in another type camera wherein the film path is different. A difference in the film path with respect to the two rollers of the filter will produce a difference in the force exerted on the rollers by the film tension, thus requiring an opposing force in one roller which is greater than the opposing force in the other roller.

In existing equipment of this type, the space available for locating the sound recording unit is usually quite limited. With limited space, the roller and supporting arm elements of the filter and the film supporting drum must be reduced in size. In using smaller elements there is introduced the possibility of a greater variation in friction in the bearing of the separate sets of rollers and scanner drums. A difference in friction in the bearings in the separate set of similarly designed filter units will produce a condition wherein to obtain equalization of the film tension on both sides of the film supporting drum, it will be necessary to produce different opposing forces in the two rollers to compensate for the change in film tension introduced by the change in friction in the bearings.

It is the object of this invention to provide a mechanical filter of the double roller type incorporating means permitting independent adjustment of the force exerted by each roller on the film whereby the mechanical filter may be adapted for efficient operation in all film drives regardless of the film path with respect to the separate rollers.

A feature of the invention resides in the provision of a double roller mechanical filter incorporating an interconnecting spring between the parallel roller supporting arms, the spring being so disposed with respect to these arms and anchored thereto in such manner that the length of the acting radius of the spring with respect to each arm may be independently adjusted to vary the force exerted by each roller on the film.

Figure 2:
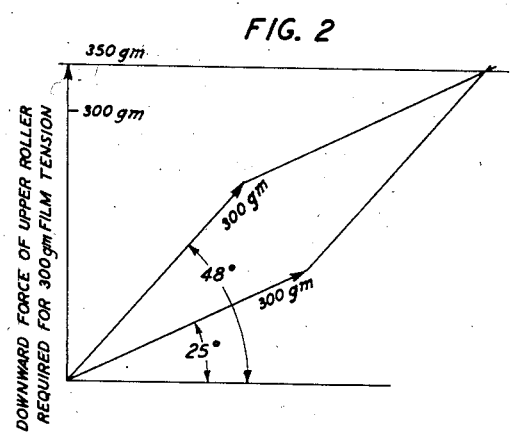

The invention will be more readily understood by reference to the following specification when read in connection with the accompanying drawing in which:

Fig. 1 is a view in elevation of a camera film drive in which a mechanical filter and film supporting drum have been added in accordance with this invention; and Fig. 2 is a diagram of the forces acting on the upper filter roller in the drive as shown in Fig. 1.

Referring to Fig. 1, a film F is driven in the direction indicated by the arrow by a toothed driving sprocket 1. A sprocket 2 engages the film F and feeds it to a suitable take-up reel (not shown). The loop of film between sprockets 1 and 2 engages and produces rotation of a freely rotatable drum 3, which supports the film F at the sound recording point. Drum 3 is rotatable on a suitable bearing on a stud 4 secured to the camera housing. Prior to engagement of film F with drum 3, it is engaged by a roller 5, which is freely rotatable in the end of a supporting arm 6. The other end of arm 6 is pivoted on the camera housing at 7. The film leaving roller 3 is engaged by a roller 8, which is freely rotatable in the end of a supporting arm 9. Arm 9 is pivoted on the camera housing at 10.

The two arms 6 and 9 are interconnected by a spring 11 in a manner to urge the rollers 5 and 8 against the film on opposite sides of drum 3. A threaded stud 12 engages an internally threaded hole in arm 6 beyond the pivot point 7 from the roller 5. One end of spring 11 is anchored to the end of stud 12 extending above arm 6. A threaded stud 13 engages an internally threaded hole in arm 9 between the pivot point 10 and the roller 8. The other end of spring 11 is anchored to the end of stud 13 below the arm 9.

Stud 12 may be rotated in a manner to increase or decrease the length thereof extending above arm 6 to thus increase or decrease the length of the acting radius R of spring 11 on arm 6. Similarly, stud 13 may be rotated in a manner to increase or decrease the length thereof extending below arm 9 to thus increase or decrease the length of the acting radius R' of spring 11 on arm 9. An increase in the acting radius R will increase the downward force exerted by spring 11 on arm 6 which, in turn, produces an increase in the force exerted by roller 5 on the film F. Similarly, an increase in the acting radius R' will increase the downward force exerted by spring 11 on arm 9 which, in turn, produces an increase in the force exerted by roller 8 on the film F.

It will be seen that by means of the novel arrangement of the spring interconnecting the two roller supporting arms 6 and 9, the force exerted by each roller on the film may be independently adjusted to compensate individually for the difference in the film tension force acting against the rollers due to a difference in the film path with respect to each roller.

A typical example of a film path likely to be encountered in a camera film drive is shown in Fig. 1. As shown, the film F approaches the roller 8 from drum 3 at an angle of 25 degrees to the horizontal. The film after passing under roller 8 leaves the surface thereof at an angle of 48 degrees to the horizontal to contact with sprocket 2. Assuming a film tension of 300 grams at a point A, a reference to the diagram of forces in Fig. 2 will show that for a film tension of 300 grams a vertical force of 350 grams is exerted by the film on roller 8. It will, therefore, be necessary to produce an opposing force in roller 8 equal to the 350 grams, whereas in roller 5, because of the vertical path of the film from this roller to sprocket 1, it will be necessary to produce an opposing force of only 300 grams, which is the film tension at point B.

As stated above, separate sets of similarly manufactured mechanical filters and scanner drums may vary as to bearing friction. An increase in bearing friction in the rollers over an allowable maximum is likely to produce an appreciable increase in the normal 300-gram film tension at the point A, thus requiring a further adjustment by means of stud 13 to produce an additional increase in the opposing force exerted by roller 8 on the film to equalize the tensions produced in the film on opposite sides of the drum 3. If the film F in the drive shown was driven in a direction opposite to that shown by the arrow, an increase in the normal 300-gram film tension caused by bearing friction would appear at point B, thus requiring an increase in the downward force exerted by roller 5 on the film.

Means for damping resonant oscillation of the mechanical filter is provided in the form of an oil dash pot comprising a stationary oil-filled chamber 15 and a movable plunger 16 pivoted to arm 6 at 17.

A film threading target is provided in the form of an element 18 attached to arm 9 and provided with a line mark 19. A second element 20 of the target is attached to arm 6 and provided with a circular aperture 21. If, with the film threaded in the machine, the line 19 appears at the center of aperture 21, the arms 6 and 9 are parallel and therefore meet one requirement for correct operation of the filter mechanism. The arms 6 and 9 in the mechanical filter shown in Fig. 1 must not only be parallel but they must also be horizontal to be in correct operating position with respect to drum 3.

When the film driving mechanism is in operation, the stud 12 may be adjusted in arm 6 by rotating a knurled element 25 attached to the end of this stud. A similar knurled element (not shown) may be provided on the end of stud 13. These studs may be adjusted during operation of the film drive until the target position is obtained for correct operating position of the arms 6 and 9.

It is possible that after final adjustment of the mechanical filter, the arms 6 and 9 will be parallel as indicated by the target but that these arms will not be quite horizontal. It has been found that a slight vernier adjustment of one of the studs will correct this condition without adversely affecting the force adjustment of the rollers.

It will be apparent from the above description that the mechanical filter provided in accordance with this invention may be incorporated into any existing film drive and readily adjusted to produce tension equalization in the film on opposite sides of the drum supporting the film at the recording or reproducing point.

What is claimed is:

1. The combination in a sound film recording or reproducing apparatus provided with a rotatable drum supporting said film at an exposure point, of a mechanical filtering means, said filtering means comprising a pair of pivoted arms, each of said arms having a film engaging roller mounted in the free end thereof, the two said rollers engaging said film on opposite sides of said drum, a spring disposed substantially parallel to and interconnecting said pivoted arms to produce movement thereof in a direction to cause said rollers to engage said film, and means anchoring the ends of said spring to said arms, each said anchoring means being individually adjustable toward and away from its associated arm to vary the acting radius of said spring separately with respect to said arms.

2. The combination in a light film recording or reproducing apparatus provided with a light exposure point and a rotatable drum supporting said film at said exposure point, of a mechanical filtering means comprising a pair of pivoted arms each having a film engaging roller mounted in the free end thereof, the two said rollers engaging said film on opposite sides of said drum, a spring disposed substantially parallel to said arms, a stud extending from each of said arms with the free end thereof engaging an end of said spring, each of said studs being adjustable in its associated arm to vary the acting radius of said spring separately with respect to said arms to permit equalization of the force exerted by said rollers on said film on opposite sides of said drum.

3. The combination in a sound film recording and reproducing apparatus provided with a light exposure point and a rotatable drum supporting said film at said exposure point, of a mechanical filtering means comprising a pair of parallel pivoted arms each having a film engaging roller mounted in the free end thereof, said film engaging each of said rollers on the underside thereof, a spring disposed substantially parallel to and between said arms, one end of said spring being anchored to one of said arms between its pivot and its roller carrying end, the other end of said spring being anchored to the other of said arms at the end thereof opposite its pivot from its roller carrying end, and means permitting adjustment of each anchorage toward or away from its associated arm to vary the acting radius of said spring with respect to each arm.

CHARLES C. DAVIS.

REFERENCES CITED

The following references are of record in the file of this patent:

UNITED STATES PATENTS

| Number | Name | Date |
|---|---|---|
| 1,831,562 | Heisler | Nov. 10, 1931 |
| 2,442,400 | Collins | June 1, 1948 |

FOREIGN PATENTS

| Number | Country | Date |
|---|---|---|
| 370,001 | Great Britain | Mar. 24, 1932 |